United States Patent

Joynes et al.

[15] 3,706,381

[45] Dec. 19, 1972

[54] CHROMATOGRAPHIC APPARATUS

[72] Inventors: Peter Leonard Joynes; Robert James Maggs, both of Cambridge, England

[73] Assignee: Pye Limited, Cambridge, England

[22] Filed: April 22, 1971

[21] Appl. No.: 136,494

[30] Foreign Application Priority Data

May 19, 1970 Great Britain.....................24,287/70

[52] U.S. Cl............210/198 C, 23/253 R, 73/61.1 C, 210/85, 324/65
[51] Int. Cl. .............................................B01d 15/08
[58] Field of Search.........210/198, 96, 85; 23/253 R; 73/23.1, 61.1 C; 324/62, 65; 55/67, 197, 386

[56] References Cited

UNITED STATES PATENTS 3,528,778  9/1970  McKaveney et al. ...............23/253 R

FOREIGN PATENTS OR APPLICATIONS 1,194,376  6/1970  Great Britain......................210/31 C Primary Examiner—John Adee
Attorney—Watson, Cole, Grindle & Watson

[57] ABSTRACT

For liquid chromatographic apparatus where the solute in the eluant exhibits electrochemical properties and the mobile phase is an electrolyte, a detector comprises a first electrode formed of a solid suspension of carbon in an electrically insulating material and a second electrode. An electric potential which may be a d.c. potential but preferably is an alternating potential with a d.c. bias is applied between the electrodes and the resultant current is measured. The first electrode is conveniently a carbon impregnated silicone rubber membrane but other constructions are described.

19 Claims, 7 Drawing Figures

PATENTED DEC 19 1972
3,706,381
SHEET 1 OF 2
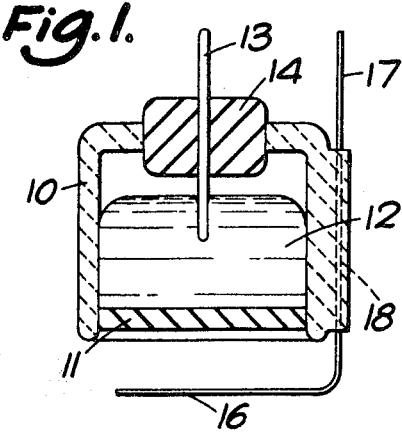
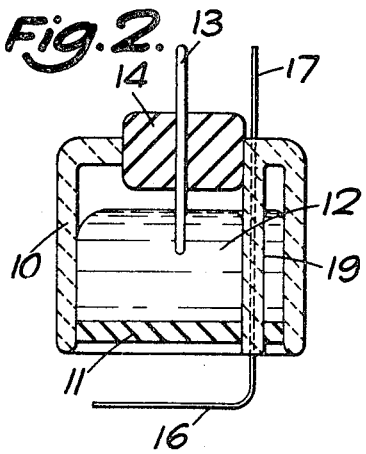
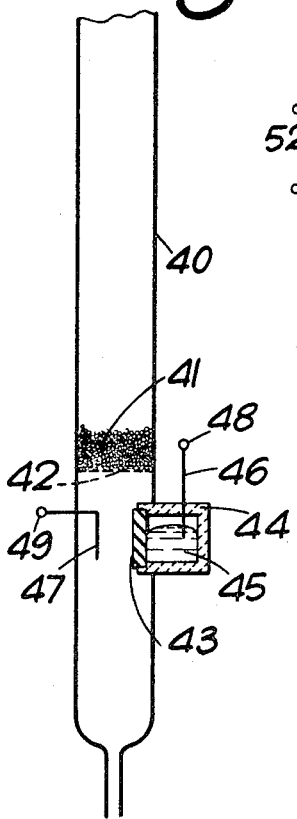
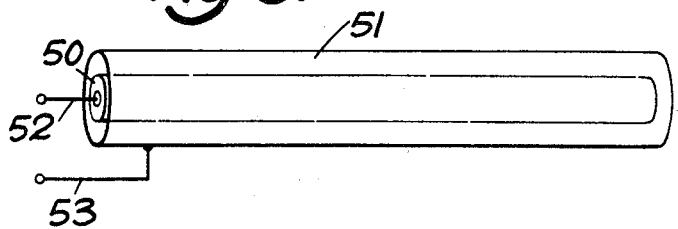
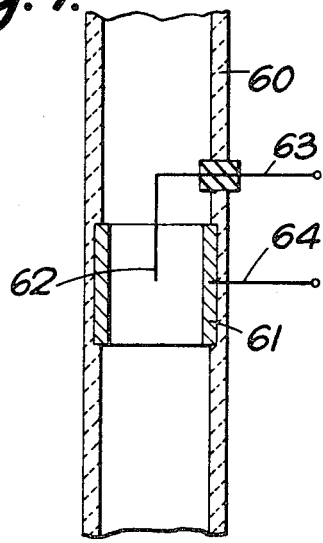
Inventors
Peter Leonard Joyner
Robert James Waggs
by
Watson, Cole, Grindle & Watson

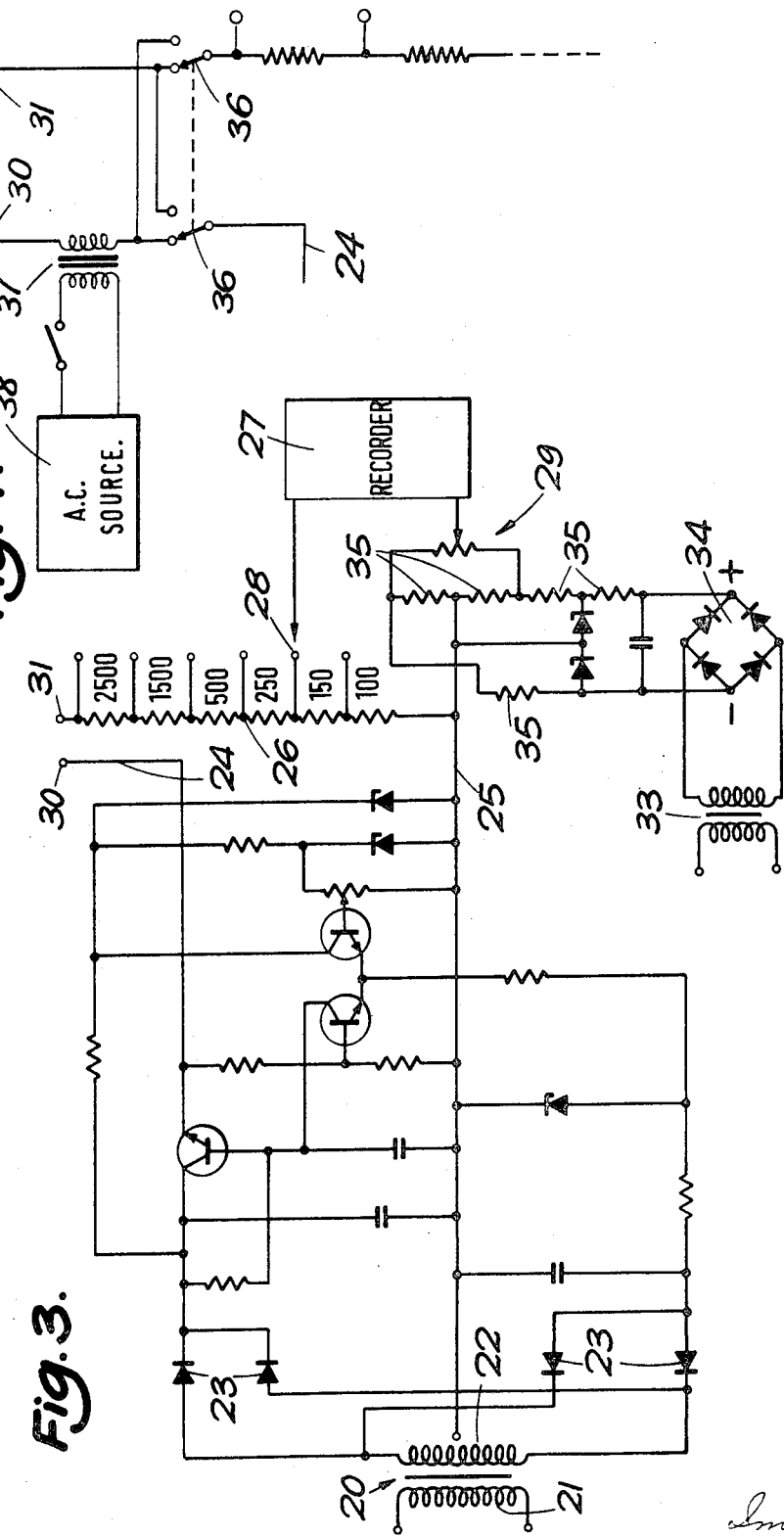

CHROMATOGRAPHIC APPARATUS

BACKGROUND OF THE INVENTION

1. Field of the Invention

This invention relates to chromatographic apparatus and is concerned more particularly with the electrochemical detection of materials in the eluent of a liquid chromatographic apparatus.

A detector for liquid chromatographic apparatus should desirably have versatility (that is to say a wide range of applications), high sensitivity, be capable of continuous monitoring of the eluent from the chromatograph column and give an output which is independent of the column parameters such as the mobile phase composition and the flow rate. No detector available at the present time fulfils all these requirements and the use of several different detectors is necessary if a wide range of applications and techniques are to be employed.

The present invention is concerned more particularly with the detection of materials where the solute in the eluent exhibits electrochemical properties and the mobile phase is an electrolyte. The solution can be organic mixtures or aqueous mixtures of inorganic salts and acids but a water-miscible organic component may be added to the latter to increase the solubility of the solute or solutes. This is the case for example in ion exchange chromatography.

2. Prior Art

It has been proposed to use polargraphic techniques employing a dropping mercury electrode as a detector for liquid chromatography but this technique has the disadvantages that there is considerable noise associated with the dropping mercury, the noise frequency being a function of the drop rate and that, unless special circuit techniques are employed, it is necessary to remove oxygen from the eluent since it interferes with the detection of other solutes.

SUMMARY OF THE INVENTION

It is an object of the present invention to provide, in liquid chromatographic apparatus, an improved form of detector for detecting solutes exhibiting electrochemical properties.

According to the present invention, in a liquid chromatographic apparatus, for the detection of solutes exhibiting electrochemical properties in the eluent, there is provided a detector comprising a first electrode fabricated of a solid suspension of carbon in an electrically insulating material and a reference electrode spaced from the first electrode, the first electrode and the reference electrode being immersed in the eluent, means for applying an electric potential between the electrodes and means responsive to the resultant electric current between the electrodes.

The first electrode may be a carbon impregnated silicone rubber electrode.

The first electrode may conveniently be formed as a membrane; this membrane may have one surface in contact with the eluent from the chromatographic column and a globule of mercury provided to make electrical contact with the other surface. In another construction, the carbon impregnated silicone rubber electrode is in the form of a rod forming the inner electrode of a concentric electrode system, the eluent passing between the electrodes.

The mode of operation of this detector is dependent upon both oxidation and reduction mechanisms and the applied potential must be of the correct polarity to ensure a high detector response. The electric potential is preferably a direct potential. Conveniently a stabilized d.c. power supply is connected across the electrodes in series with at least one resistor. The current between the electrodes may then be measured by measuring the voltage across a resistor or across part of a resistor. A potentiometric recorder may be employed for this purpose.

To cater for different solute types, provision may be made for reversing the polarity of the biasing potential applied between the electrodes. If a direct potential is used, an alternating voltage may be injected across the electrodes to reduce the possibility of electrolysis products accumulating on the surface of the carbon membrane, the alternating potential being of smaller magnitude than the direct potential between the electrodes.

The solvent in the eluent will normally be an electrolyte and the response of the detector is dependent not only on the solute but also on the background electrolyte. However with a suitable range of electrolytes, a wide range of chromatographic analysis can be carried out. This type of detector can be constructed to have a low residual or standing current and adjustable means may be provided to give a balancing signal to the indicator or recorder to balance the standing current. The noise level is far less than with a dropping mercury electrode using polarographic techniques and no damping is required such as is necessary due to the noise at the drip rate with a dropping mercury system. Oxygen interference is not significant and the formation of oxide films is not a serious problem. The detector can be used for both organic and inorganic analyses. The detection system may be made simple and of robust construction. It is readily possible to ensure that there is only a very small "dead volume" in the detector system whilst still having a large surface area of the membrane to ensure a large response and the construction may readily provide a fast response time typically better than 3 seconds.

The reference electrode is conveniently a platinum electrode and may, for example, comprise a platinum wire or plate.

BRIEF DESCRIPTION OF THE DRAWINGS

FIG. 1 is a sectional view of one construction of electrode system of a detector for a liquid chromatograph;

FIG. 2 is a view similar to FIG. 1 of a modification of the construction of FIG. 1;

FIG. 3 is a circuit diagram illustrating the electrical circuit employed with a detector such as that of FIGS. 1 and 2;

FIG. 4 illustrates a modification of part of the circuit of FIG. 3; and

FIGS. 5, 6 and 7 are diagrams illustrating further constructions of detectors arranged in the column of liquid chromatographic apparatus.

DESCRIPTION OF THE PREFERRED EMBODIMENTS

Referring to FIG. 1, there is shown a detector for electrochemically detecting the solutes in the eluent of a liquid chromatographic column, which detector includes a glass envelope 10 closed at one end by a carbon impregnated silicone rubber membrane 11. Within the envelope is a small drop of mercury 12 which covers the membrane to make electrical contact therewith. A wire electrode 13 is sealed into the envelope at 14 and extends into the mercury to make electrical contact therewith. Spaced from the membrane is a reference electrode 16 consisting of a platinum wire or plate connected by a platinum wire 17 which is held by the glass of the envelope as shown at 18 so that the reference electrode is parallel to but spaced away from the outer surface of the carbon impregnated silicone rubber electrode 11.

FIG. 2 illustrates a modification of the construction of FIG. 1 and the same reference numerals are used to denote corresponding components. In FIG. 2 the wire 17 for supporting the reference electrode passes through the envelope and mercury, being electrically insulated therefrom by a glass coating as shown at 19.

The electrode systems of FIG. 1 and 2 are used by measuring the current between the electrodes when they are immersed in the eluent from a liquid chromatographic column with a potential applied across the electrodes.

FIG. 3 illustrates a power supply source which may be used with the cell of FIGS. 1 and 2. The power supply source has an input transformer 20 with a primary winding 21 for connection to an alternating mains supply and a secondary winding 22 providing a low voltage output (typically +23V and −23V) which is rectified by rectifiers 23 forming a full wave rectifier system giving a direct voltage output stabilized by a solid state regulator circuit to give a stabilized output of 15V between lines 24 and 25. Line 24 is connected at a terminal 30 to one electrode of the cell while line 25 is connected via a resistor chain 26 to the other electrode at a terminal 31. The current between the electrodes is sensed by measuring the voltage across part of the resistor chain, for example by connecting a recorder 27 between a tap 28 and an adjustable bias voltage circuit 29. This biasing circuit comprises an input transformer 32 providing a 12-5V supply to a full wave rectifier 34 giving a direct voltage output across a potential divider formed by a chain of resistors 35, a tap on the divider being connected to the line 25.

In use the electrodes 11, 17 are immersed in the eluent from the chromatographic column and a potential of appropriate polarity and magnitude, chosen according to the particular solutes to be detected, is applied to the electrodes via the resistor chain 26. The biasing circuit 29 can be adjusted to bias off the effect of the residual or standing current due to the electrolyte forming the solvent so that the output signals on the recorder is indicative of the presence of the solute. FIG. 3 illustrates a stabilized d.c. power supply for application to the electrodes.

Preferably, as shown in FIG. 4, means are provided for injecting an alternating voltage across the electrodes to reduce the possibility of electrolysis products accumulating on the surface of the carbon membrane. Simultaneously a d.c. biasing potential is applied, the alternating potential being of smaller magnitude than the direct potential between the electrodes. Provision may be made for reversing the polarity of the biasing potential to cater for different solute types.

Such a modification is illustrated in FIG. 4 where the line 24 to terminal 30 and the line to terminal 31 include ganged changeover switches indicated diagrammatically at 36 which switch enables the applied polarity to be reversed. Superimposed on this d.c. biasing potential is an alternating voltage input from a transformer 37 and alternating supply source 38.

FIG. 5 illustrates another construction of detector. Referring to FIG. 5 there is shown a chromatographic column 40 with an electrode assembly in the column. For a liquid/solid chromatographic apparatus, the column packing, indicated diagrammatically at 41, is preferably terminated directly above the electrode as indicated by the dashed line 42. Below the packing is the carbon impregnated silicone rubber membrane 43 constituting one electrode and forming a closure to a glass envelope 44 containing mercury 45 to make electrical contact with the membrane 43. A wire 46 passing through the glass envelope dips into the mercury for making a circuit connection thereto. The reference electrode is a platinum plate or wire 47 in the chromatographic column facing the carbon impregnated silicone rubber membrane 43. The wires 46, 47 are connected, at terminals 48, 49 respectively, to a power supply and recorder unit, e.g., to the terminals 30, 31 of FIG. 3 or FIG. 4.

In order to reduce the volume of the cell formed by the electrodes below the packing 41 in the column, the tube chromatographic column below the packing can be filled with glass balls.

FIG. 6 illustrates another construction of detector electrode system. In FIG. 6 a concentric construction is employed with a central electrode 50 formed of a rod or carbon impregnated silicone rubber. The outer electrode consists of a concentric platinum cylinder 51. The liquid flow from the chromatographic column passes through the annular region between the two electrodes. The electrode 50 is connected at one end, to a wire 52 while the electrode 51 is connected to a wire 53. These wires are connected to a power supply and recorder unit, e.g., to the terminals 30, 31 of FIG. 3 or FIG. 4.

FIG. 7 illustrates yet another construction in which the detector system is arranged in the chromatographic column. Referring to FIG. 7 the column is shown at 60 and, below the packing (not shown), there is provided an outer electrode 61 consisting of a carbon impregnated silicone rubber membrane extending around the inner surface of the column. An inner central electrode consists of a platinum wire 62 extending along the axis of the column, concentric and within the carbon impregnated rubber membrane. Connecting wire 63 is sealed in a bush in the tube wall and extends through the wall to effect electrical connection to the electrode 62. A second wire 64 extends through the wall to the electrode 61. These wires lead to a power supply and recorder unit, e.g., to the terminals 30, 31 of FIG. 3 or FIG. 4.

In the construction of FIGS. 6 and 7, as in FIG. 5, the volume of the electrode cell should be kept to a minimum. In practice, if the column is above 1 millimeter in diameter, the cell is conveniently packed to reduce band-spreading of the solute. The packing in the cell may be glass balls as has been described with reference to FIG. 5. In any of these constructions alternating column packing material may be employed. Instead of packing the cell, the volume of the cell can be reduced by introducing a restriction in the column in the appropriate region.

We claim:

1. In a liquid chromatographic apparatus; a detector for the detection of solutes exhibiting electrochemical properties in the eluent, said detector comprising a first electrode fabricated of a solid suspension of carbon in an electrically insulating material and a reference electrode spaced from the first electrode, the first electrode and the reference electrode being immersed in the eluent, means for applying an electric potential between the electrodes and means responsive to the resultant electric current between the electrodes.

2. A detector for a liquid chromatographic apparatus as claimed in claim 1 wherein said first electrode is a carbon impregnated silicone rubber electrode.

3. A detector for a liquid chromatographic apparatus as claimed in claim 1 wherein said first electrode is formed as a membrane.

4. A detector for a liquid chromatographic apparatus as claimed in claim 3 wherein the membrane is arranged with one surface in contact with the eluent from the chromatographic column and wherein a globule of mercury is provided to make electrical contact with the other surface of the membrane.

5. A detector for a liquid chromatographic apparatus as claimed in claim 1 wherein said first electrode is in the form of a rod forming the inner electrode of a concentric electrode system, the element passing between the electrodes.

6. A detector for a liquid chromatographic apparatus as claimed in claim 1 wherein said means for applying an electric potential between the electrodes comprises a source of direct potential.

7. A detector for a liquid chromatographic apparatus as claimed in claim 6 wherein switch means are provided for reversing the polarity of the applied direct potential.

8. A detector for a liquid chromatographic apparatus as claimed in claim 6 wherein means are provided for superimposing an alternating voltage on the applied direct potential, the alternating potential being of smaller magnitude than the direct potential between the electrodes.

9. A detector for a liquid chromatographic apparatus as claimed in claim 6 wherein said means for applying an electric potential between the electrodes comprises a stabilized power supply connected across the electrodes in series with at least one resistor and wherein the means responsive to the current between the electrodes comprises a potentiometric recorder measuring the voltage across at least part of said resistor.

10. A detector for a liquid chromatographic apparatus as claimed in claim 1 wherein said means responsive to the current between the electrodes comprises an indicator or recorder and wherein adjustable means are provided giving a balancing signal to the indicator or recorder to balance the standing current.

11. A detector for a liquid chromatographic apparatus as claimed in claim 1 wherein the reference electrode is formed of platinum.

12. A detector for a liquid chromatographic apparatus as claimed in claim 1 wherein packing is provided in the region between said electrodes to reduce the volume of the cell constituted by said electrodes.

13. A detector for a liquid chromatographic apparatus as claimed in claim 3 wherein said detector comprises a glass envelope with said membrane extending across and sealing an aperture in the envelope, mercury in the envelope in contact with said membrane and a wire extending through the envelope into the mercury, said wire being sealed in said envelope and wherein the reference electrode is mounted on said envelope and comprises a platinum wire or plate outside the envelope substantially parallel to but spaced from said membrane.

14. A detector for a liquid chromatographic apparatus as claimed in claim 3 wherein said detector comprises a glass envelope with said membrane extending across and sealing an aperture in the envelope, mercury in the envelope in contact with said membrane and a wire extending through the envelope into the mercury, said wire being sealed in said envelope, said glass envelope being sealed into the tube of the chromatographic column below the level of packing in the column and wherein the reference electrode comprises a platinum wire or plate in said column parallel to said membrane and with a connecting wire extending through the column wall.

15. A detector for a liquid chromatographic apparatus as claimed in claim 14 wherein the tube below the packing is filled with glass balls to reduce the volume of the liquid within the cell formed by the electrodes.

16. A detector for a liquid chromatographic apparatus as claimed in claim 3 and having the detector below the packing in a tube forming the chromatographic column, the membrane being arranged to extend around the inner surface of the tube and the reference electrode being a platinum wire extending axially of the tube, connections to the electrodes extending through the tube wall.

17. In a liquid chromatographic apparatus having a chromatographic column for the detection of solutes exhibiting electrochemical properties; a detector for detecting solutes in the eluent from the column, said detector comprising a carbon impregnated silicone rubber membrane, means supporting said membrane with one surface exposed for immersion in the eluent, an electrically conductive element in contact with the other surface of the membrane, a platinum electrode in said eluent spaced from and parallel to said one surface of the membrane, at least one resistor and a stabilized power supply connected in a series electrical circuit between said conductive element and said platinum electrode, and a potentiometric recorder connected to measure the voltage across at least part of said resistor.

18. A detector for a liquid chromatographic apparatus as claimed in claim 17 and having a cell with said membrane extending across an open face thereof, said conductive element being formed by mercury in said cell.

19. A detector for a liquid chromatographic apparatus as claimed in claim 17 wherein said stabilized power supply provides a d.c. voltage and wherein switch means are provided for reversing the polarity of the voltage applied to the electrodes and wherein means are provided for superimposing an alternating voltage on the applied direct voltage.

* * * * *